United States Patent
Flumeri et al.

(10) Patent No.: US 12,304,319 B2
(45) Date of Patent: May 20, 2025

(54) METHOD FOR THE PERFORMANCE-ENHANCING DRIVER ASSISTANCE OF A ROAD VEHICLE

(71) Applicant: FERRARI S.p.A., Modena (IT)

(72) Inventors: Alessandro Flumeri, Modena (IT); Andrea Giacomini, Modena (IT); Fabio Tancredi, Modena (IT)

(73) Assignee: FERRARI S.P.A., Modena (IT)

( * ) Notice: Subject to any disclaimer, the term of this patent is extended or adjusted under 35 U.S.C. 154(b) by 288 days.

(21) Appl. No.: 17/845,474

(22) Filed: Jun. 21, 2022

(65) Prior Publication Data
US 2022/0410723 A1 Dec. 29, 2022

(30) Foreign Application Priority Data

Jun. 29, 2021 (IT) .................. 102021000017087

(51) Int. Cl.
*B60L 15/20* (2006.01)
*B60L 7/10* (2006.01)
*B60W 20/15* (2016.01)

(52) U.S. Cl.
CPC ............. *B60L 15/2009* (2013.01); *B60L 7/10* (2013.01); *B60L 2240/12* (2013.01);
(Continued)

(58) Field of Classification Search
CPC .. B60W 30/188; B60W 50/085; B60W 20/10; B60W 20/14; B60W 50/0097; B60W 20/12; B60W 20/11; B60W 10/26; B60W 10/08; B60W 20/15; B60W 2530/10; B60W 2710/083; B60W 2552/05;
(Continued)

(56) References Cited

U.S. PATENT DOCUMENTS

| 8,204,640 B2 | 6/2012 | Tani et al. | |
| 2009/0259355 A1* | 10/2009 | Li | G01C 21/26 903/930 |
| 2020/0254992 A1* | 8/2020 | Langhorst | B60W 20/19 |

FOREIGN PATENT DOCUMENTS

DE 102017121372 A1 * 3/2018

OTHER PUBLICATIONS

Machine Translation of the Description of DE 102017121372 A1, pp. 1-19 (Year: 2018).*

(Continued)

*Primary Examiner* — Anne Marie Antonucci
*Assistant Examiner* — Jared C Bean
(74) *Attorney, Agent, or Firm* — CANTOR COLBURN LLP

(57) ABSTRACT

A method for the performance-enhancing driver assistance of a road vehicle driven by a driver and provided with at least two drive wheels driven by at least one electric motor connected to a corresponding vehicular battery pack; the method comprises the steps of defining a dynamic model of the road vehicle; determining a route of a track travelled by the road vehicle; calculating, as a function of the dynamic model of the road vehicle and of the route, a convenience index relative to the use of energy of the vehicular battery pack by the electric motor; subdividing the route (R) into a plurality of sectors assigning to each a relative value of the calculated convenience index; delivering electrical power to the drive wheels according to the value of the convenience index assigned to each sector of the route.

12 Claims, 6 Drawing Sheets

(52) U.S. Cl.
CPC ..... *B60L 2240/645* (2013.01); *B60L 2240/80* (2013.01); *B60W 20/15* (2016.01); *B60W 2520/10* (2013.01); *B60W 2552/05* (2020.02)

(58) Field of Classification Search
CPC ......... B60W 2720/10; B60W 2530/16; B60W 2300/28; B60W 2510/244; B60W 2720/103; B60W 2556/40; B60W 2520/10; B60K 6/48; B60L 7/10; B60L 15/2009; B60L 2240/80; B60L 2240/645; B60L 2240/12; B60Y 2200/90; Y02T 10/70
See application file for complete search history.

(56) References Cited

OTHER PUBLICATIONS

Machine Translation of the Claims of DE 102017121372 A1, pp. 1-4 (Year: 2018).*
Extended European Search Report for Application No. 22180688.8 mailed Sep. 29, 2022.
Zhu, Q. et al., "Control Optimization of a Charge Sustaining Hybrid Powertrain for Motorsports," SAE 2010 Commerical Vehicle Engineering Congress SAE Technical Papers, [Online] vol. 1, Apr. 10, 2018, XP055962994.
Search Report for Italian Application No. 102021000017087, completed Dec. 17, 2021, 8 pages.

* cited by examiner

METHOD FOR THE PERFORMANCE-ENHANCING DRIVER ASSISTANCE OF A ROAD VEHICLE

CROSS-REFERENCE TO RELATED APPLICATIONS

This patent application claims priority from Italian patent application no. 102021000017087 filed on Jun. 29, 2021, the entire disclosure of which is incorporated herein by reference.

TECHNICAL FIELD

The present invention relates to a method for the performance-enhancing driver assistance of a road vehicle and to a corresponding road vehicle.

PRIOR ART

Generally, the performance of a vehicle (speed, times, consumption, etc.) during the travel of a track is not maximized due to various elements (skill of the driver, weather conditions, poor knowledge of the circuit . . . ).

Moreover, speed limits on roads open to traffic are definitely much lower than the performance offered by a car, especially in the case of a high-performance sports car. Consequently, only a small part of the capabilities of a high-performance sports car is used in the normal driving on road. For this reason, it is becoming increasingly frequent for the owner of a high-performance sports car to occasionally perform laps on a track in order to try to fully exploit the performance offered by his/her car. For an inexperienced driver, however, the performance driving on track is very complicated, as it is completely different from everyday driving on roads open to traffic. In particular, it is very complicated for an inexperienced driver to understand the actual limits of the car and consequently there is, on the one hand, the possibility of not fully exploiting the performance offered by one's car and, on the other hand, there is the risk of going off the road which is potentially dangerous both for the integrity of the car, and for the safety of the driver.

Moreover, an inexperienced driver may not be aware of the optimal trajectories to follow for minimizing the times on track and therefore may not be satisfied with his/her lap performance.

In recent years, also in order to favour the performance, numerous hybrid high-performance vehicles have been developed, in which an endothermic motor is assisted by an electric motor, which injects further torque to the drive wheels during acceleration, in addition to the torque transmitted by the endothermic motor. However, such electric motors are generally powered by battery packs having very variable dimensions, which are selected by the manufacturer at the design stage in order to find a compromise between favouring the accelerations and keeping the vehicle as light as possible.

However, according to the solutions of the prior art, the vehicle uses at each acceleration the maximum power deliverable by the battery pack (based on the charge level), limiting the optimization of the performance.

For example, it often occurs that the electric motor uses up the charge of the battery pack during the first stages of the circuit, and although it manages to partially recharge under braking, the power accumulated in such manner is poorly sufficient in terms of performance, forcing the vehicle to compete for a good part of the route with a significant extra weight (resulting from the addition of the electric motor and the battery pack) with no payback in terms of vehicle performance. In such manner, with the exception of the initial part of the race during which all the power of the battery pack is used, running regularly only a small part of the same is recharged and discharged during braking and acceleration, respectively, thus determining a passive weight of the remaining part of the battery pack.

For this reason, there is a recent tendency in high-performance vehicles to use electric power systems provided with battery packs of reduced dimensions, which easily manage recharging during the deceleration and braking performed by the driver during the lap and which therefore manage to fully exploit the increased weight of the high-performance vehicle in an efficient manner.

However, such solutions are optimized only for a certain type of circuits, in fact, for circuits having a length less than that used for the dimensioning of the battery pack, the same will be overdimensioned and will not be able to discharge completely, effectively wasting part of the accumulated energy. On the other hand, for circuits having a greater length, the small contribution given by the electric motor under acceleration is distributed along the route, reducing the impact thereof on the lap time.

Finally, the solutions of the prior art, although often adjusted so as to be optimized for the vehicle on which they are mounted, do not take into account how that vehicle interfaces with each type of track. In fact, it is known that the shape and the structure of a vehicle can also strongly affect its performance upon the varying of the track.

DESCRIPTION OF THE INVENTION

The object of the present invention is to provide a method for the performance-enhancing driver assistance of a road vehicle and a corresponding road vehicle, which are at least partially exempt from the above-described drawbacks, are easy and cost-effective to embody, and in particular allow maximizing the performance during the travel of a track.

According to the present invention, a method for the performance-enhancing driver assistance of a road vehicle and a corresponding road vehicle are provided, as claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
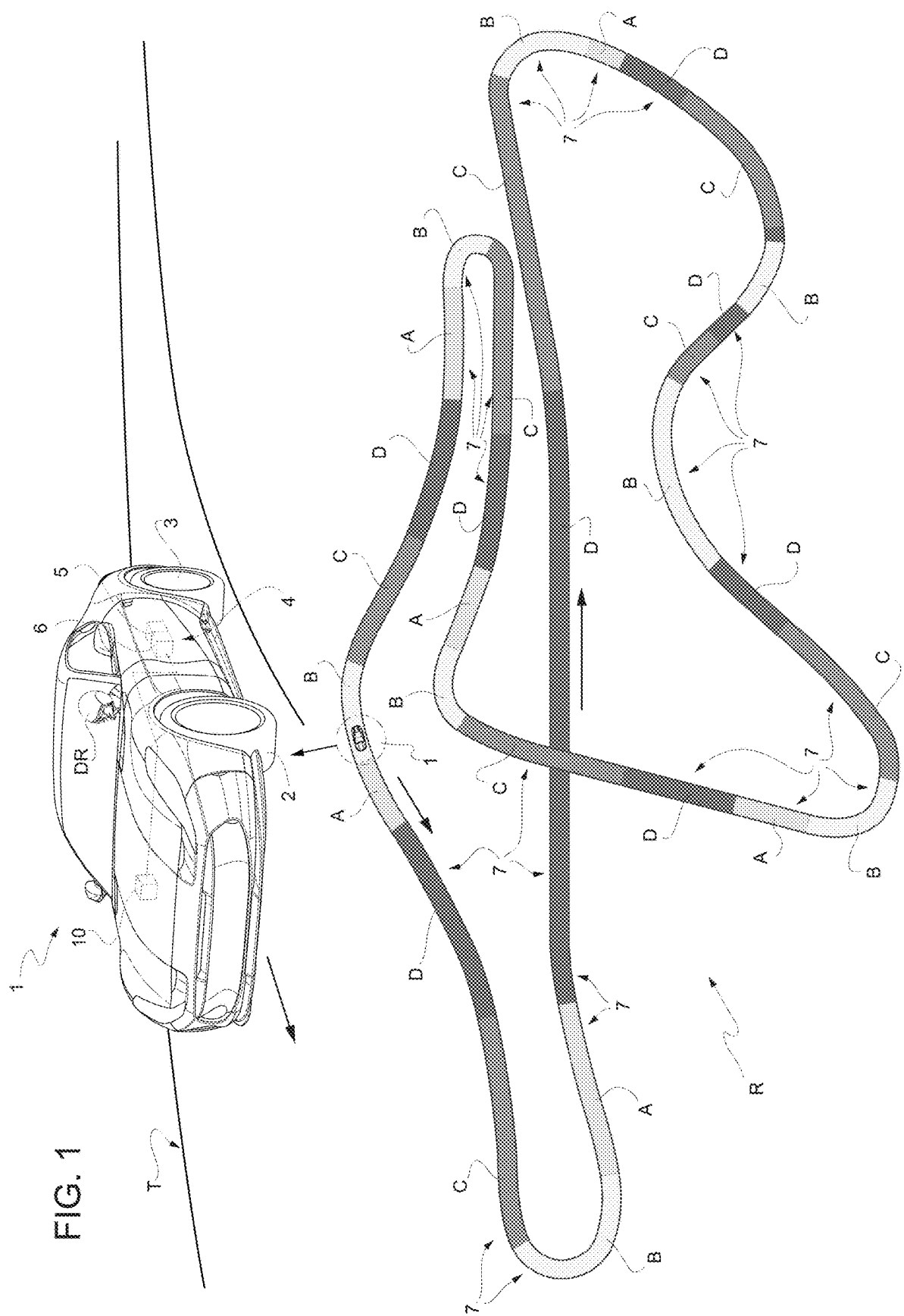
FIG. 1 is a schematic and plan view of the route of a track travelled by a high-performance road vehicle.

In FIG. 1, reference numeral 1 indicates, as a whole, a road vehicle driven by a driver DR and provided with two front wheels 2 and two rear drive wheels 3 (thus belonging to a same axle, the rear one) which receive the drive torque from a powertrain system 4.

The powertrain system 4 comprises at least one electric motor 5, in particular as an auxiliary to an endothermic motor of a known type and thus not illustrated. The electric motor is preferably arranged in a longitudinally rear, transversely central position of the road vehicle 1. Said electric motor 5 is mechanically connected to the drive wheels 3 so as to deliver to the same an additional torque to that delivered by the remaining powertrain system 4. In particular, the drive wheels 3 are driven by the electric motor 5, which is connected (so as to bilaterally exchange electrical energy) to a vehicular battery pack 6.

The road vehicle 1 comprises an electronic control unit 10 ("ECU") which, among other things, adjusts the behaviour of the road vehicle 1 both on straight roads, and while travelling a curve by intervening, as better described in the following, on the torque delivered by the electric motor 5 to the drive wheels 3, possibly in collaboration with other drive devices present on board the road vehicle 1. Physically, the control unit 10 can be composed of a single device or a plurality of devices separate from one another and communicating via the CAN network of the road vehicle 1.

According to a non-limiting embodiment, the method comprises the step of defining, on a one-off basis, in a design and development step, a dynamic model of the road vehicle 1. The expression "on a one-off basis" is understood to mean "once". In particular, it is understood to mean "every time the number of variables of the dynamic model is changed" (for example through the addition or the removal of an actuator or of a sensor).

Advantageously, the method involves determining a route R of a track T travelled by the road vehicle. In particular, the control unit 10 is configured to detect the route R of the track and identify an optimal trajectory as a function of the route R. In particular, the optimal trajectory is the trajectory which allows maintaining the highest average velocity during the lap.

Advantageously but not necessarily, the determination of the route R occurs by performing a reconnaissance lap of the track T. In such manner, it is possible to make each driver DR independent in using the method object of the present invention on any track T, also private or occasionally modified.

According to some non-limiting embodiments, a first attempt FA is performed during which the reconnaissance lap is travelled, at the end of which the error between starting points and finishing point is compensated (for example distributed over the entire length of the track T) obtaining a final estimate FE.

Figure 2:
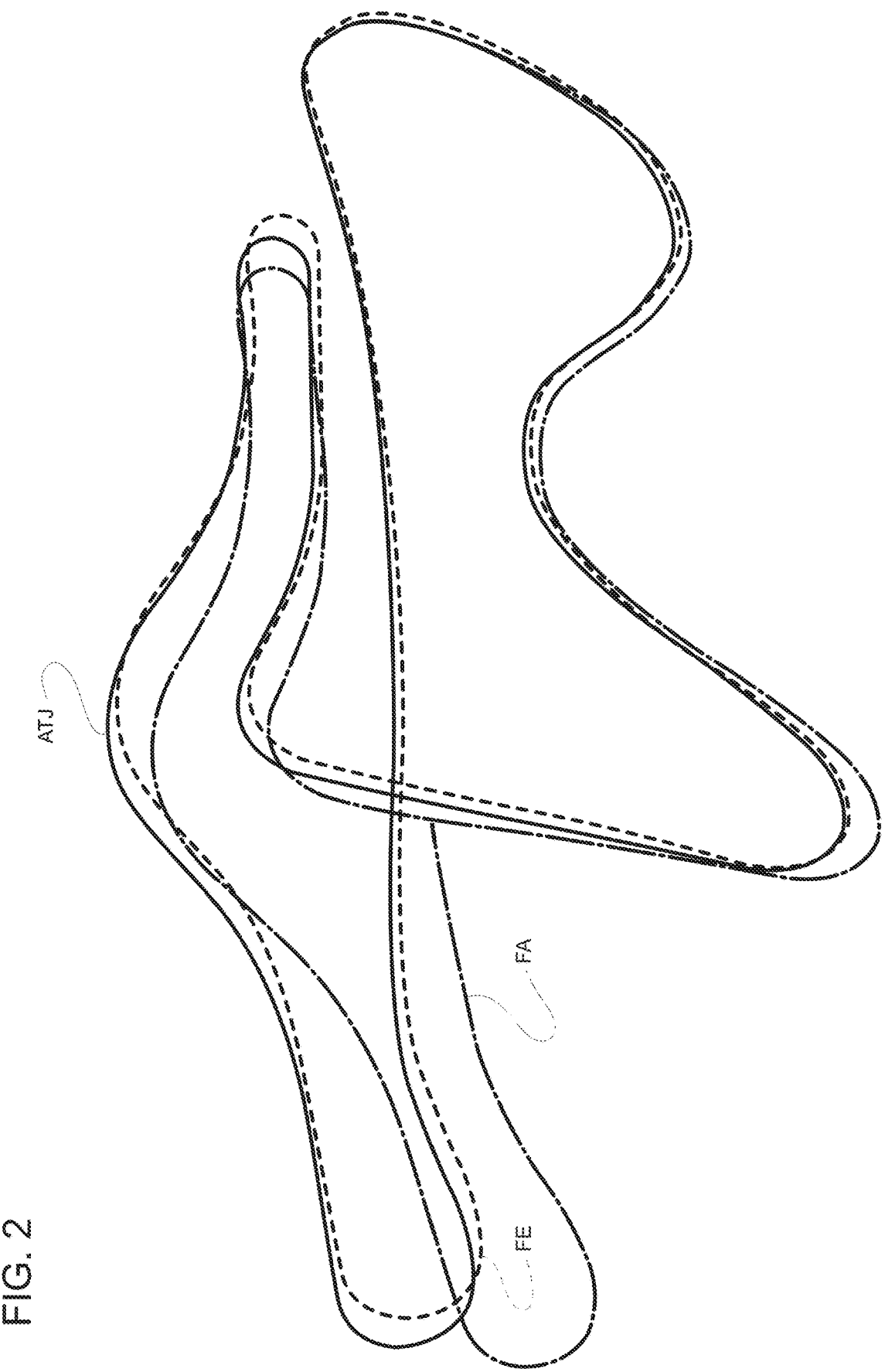
FIG. 2 is a schematic and plan view of the detection of the route of the track during a reconnaissance lap.

In the non-limiting embodiment of FIG. 2, the route R of the track T (in particular the actual trajectory ATJ) is detected by means of a satellite positioning system (for example GPS).

According to further non-limiting embodiments, the road vehicle 1 determines the route R of the track T on which it is located by identifying the current position of the vehicle (for example by means of GPS) and downloading (autonomously) from a database the information on the route to be travelled, thus without the need for a reconnaissance lap.

Figure 3:
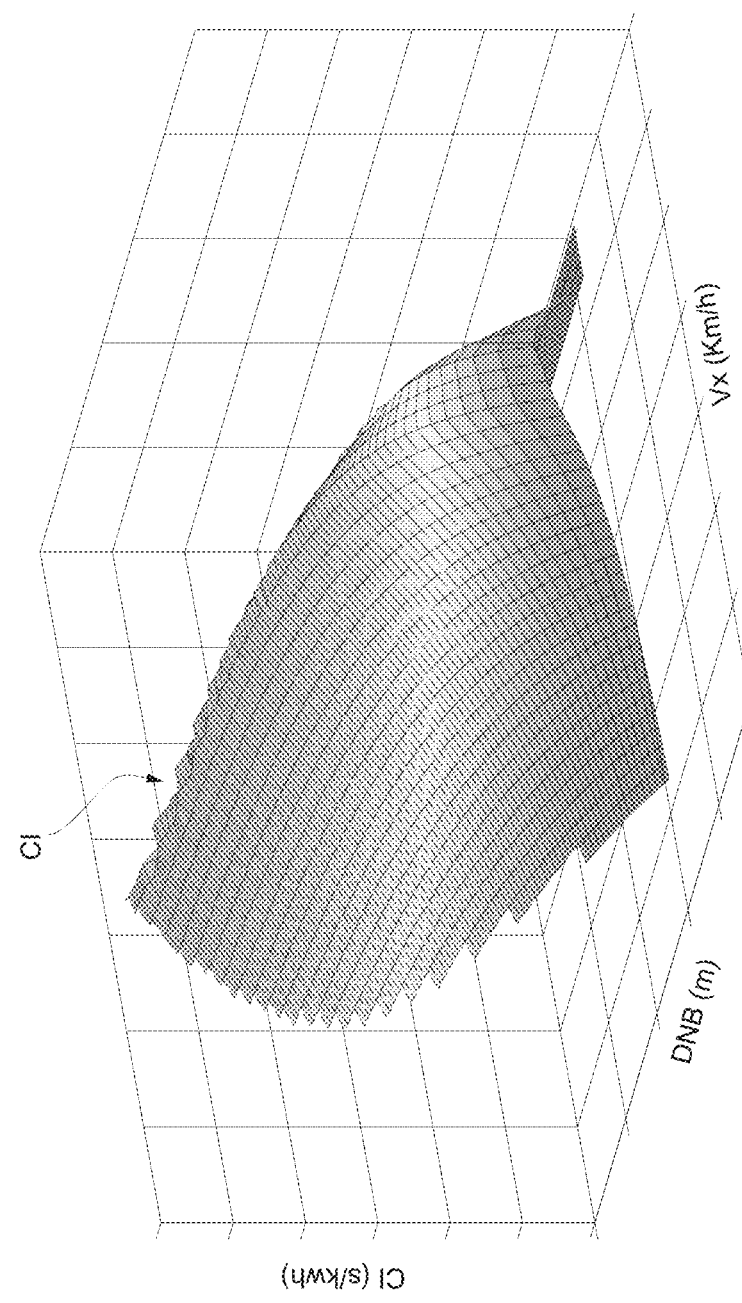
FIG. 3 is a schematic graph illustrating a convenience index.

In particular, the method involves calculating, by means of the control unit 10 and as a function of the dynamic model of the road vehicle 1 and of the route R, a convenience index CI (whose three-dimensional profile is illustrated schematically and in a non-limiting manner in FIG. 3) relative to the use of energy of the vehicular battery pack 6 by the electric motor 5.

Advantageously, and as schematically illustrated in the non-limiting embodiment of FIG. 1, the method involves subdividing the route R into a plurality of (consecutive) sectors 7 and assigning to each a relative value A, B, C, D of the convenience index CI calculated by the control unit 10. Obviously, the values A, B, C, D used in the schematic illustration of FIG. 1 represent a simplified and non-limiting example.

As a function of the value A, B, C, D of the convenience index CI assigned to each sector 7, the control unit 10 delivers electrical power to the drive wheels 3 by means of the electric motor 5. In particular, the control unit 10 determines, along the route T, one or more boost points BP (as illustrated in the non-limiting embodiment of FIG. 6) at which it is most convenient to deliver electrical power. More particularly, the control unit 10 determines, as a function of the value A, B, C, D of the convenience index CI, how much electrical power to deliver for each boost point BP.

Advantageously and as illustrated in the non-limiting embodiment of FIG. 3, the convenience index CI is a numerical value calculated as a function of the (longitudinal) velocity Vx of the road vehicle 1 (preferably calculated in Km/h) and of the distance DNB remaining before the next braking (preferably calculated in metres). In particular, the convenience index CI is calculated as a function of the model of the vehicle 1 used. In such manner, it is possible to effectively adjust the convenience index CI based on, for example, the weight and aerodynamics of the road vehicle 1.

Advantageously but not necessarily, the convenience index CI is defined as time gained on lap per kWh spent by the vehicle 1. In other words, the convenience index CI indicates the time difference between the lap of track T during which I use "n" kWh in a given sector 7 and the lap during which, in contrast, I do not use the boost offered by the electric motor 5.

Figure 4:
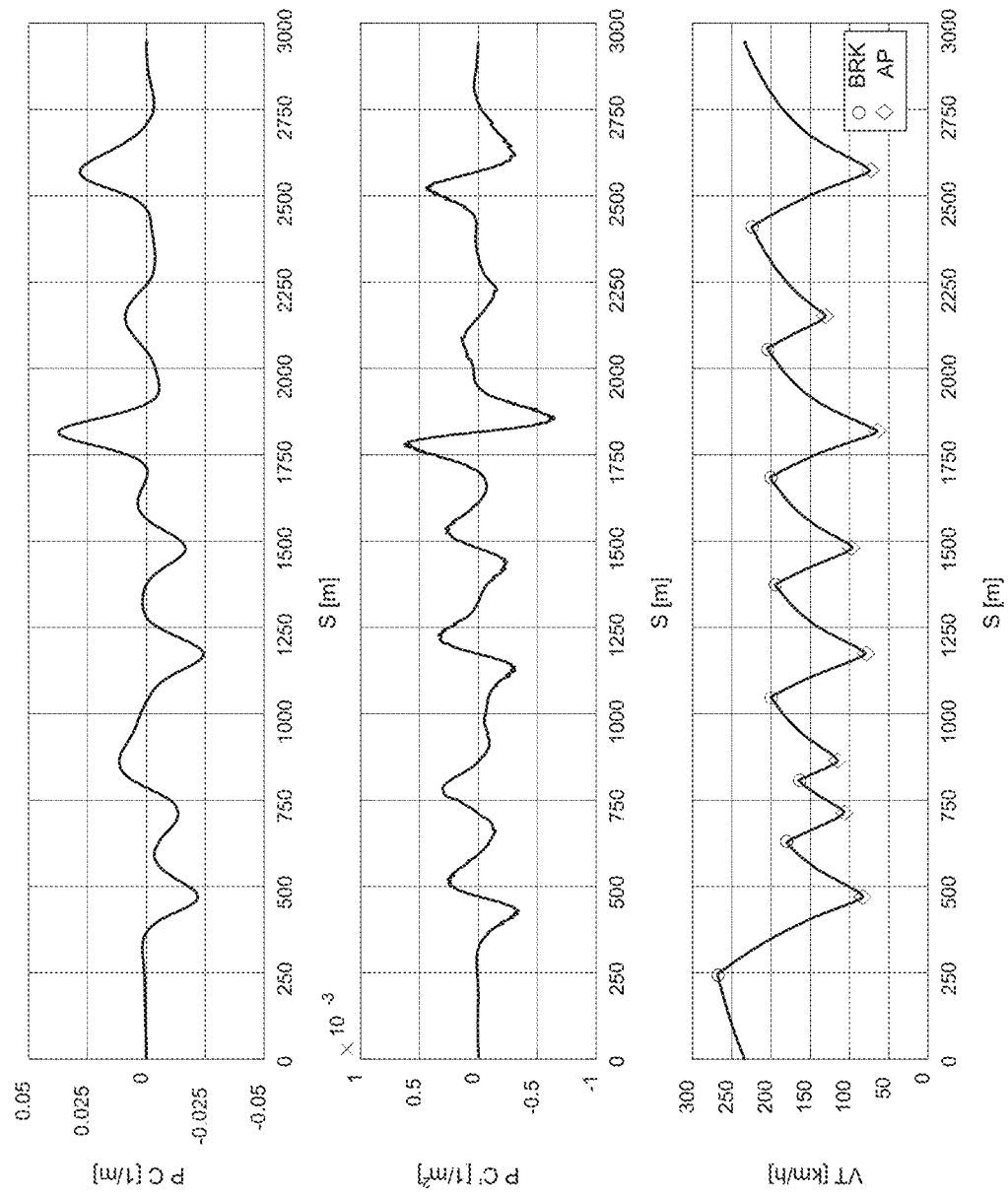
FIG. 4 schematically illustrates three graphs respectively indicating a curvature profile of the route, how it varies, and a target velocity profile for the road vehicle.

As illustrated in the non-limiting embodiment of FIG. 4, during the reconnaissance lap, or in any case as a function of the determined route R, the curvature PC of the track T is detected as a function of the distance S travelled. In particular, the control unit 10 also detects or calculates the (derived) variation PC' in the curvature PC of the track T as a function of the distance S travelled.

Preferably but not limitedly, the control unit 10 develops, as a function of the curvature PC (and of its variation PC') and of the dynamic model of the road vehicle, a target velocity profile VT at which the road vehicle 1 travels the track in an optimal manner.

In particular, as a function of the target velocity profile VT, the braking points BRK along the route of the track T are identified (comprising instant by instant the remaining distance to the next braking). More precisely, as illustrated in the non-limiting embodiment of FIG. 4, the method includes identifying both the braking points BKP and the acceleration points AP. In particular, as illustrated in the graph shown in FIG. 3, the greater the distance between the position of the vehicle (in sector 7) and the next braking point BRK, the more convenient it will be to use the supplementary boost of the electric motor 5. In particular, in FIG. 3, the central crest of the curve indicates the areas of greatest convenience for the use of the electrical energy stored in the battery pack 6. More particularly, the profile of the convenience index CI has a bell-shaped progression along the axis of the velocity Vx, i.e. it increases up to a certain velocity Vx of the road vehicle (for example 150 km/h) to then decrease at a further increase of the same.

By way of example, the sectors 7 in which it is more convenient to deliver electrical power to the drive wheels 5 are the sectors 7 with a value A (in FIG. 1), i.e. the sectors leaving the curves where one is very close to an acceleration point AP and very far from the next braking point BRK, whereas the value D is understood to denote the sectors closer to the next braking point BRK and less convenient.

Therefore, as mentioned in the foregoing, advantageously but not necessarily, each sector 7 (for example each metre of the track T) is assigned a corresponding convenience index CI, which indicates how convenient it is to consume energy in that individual sector 7 (i.e. how much time the road vehicle 1 gains investing energy in that given sector with respect to not investing it).

Preferably, when delivering electrical power to the drive wheels (3), the recharging capacity of the battery pack 6 during the travel of the track (T) is taken into account.

According to some non-limiting embodiments, when calculating the convenience index CI, the recharging capacity of the battery pack 6 during the travel of the track T is taken into account. In other words, the index CI is adjusted by considering how much electrical energy is recovered under braking and deceleration by the battery pack 6 during a lap or part thereof.

According to other preferred non-limiting embodiments, the method involves calculating (regardless of the convenience index CI) an energy budget of the road vehicle 1, in particular of the battery pack 6. As a function of the available energy budget, an optimal energy threshold value is developed (preferably but not necessarily for each sector 7). In particular, the optimal threshold value indicates (in s/kWh) an optimal reference value for the convenience index CI. More particularly, in the case where the value of the convenience index CI exceeds the optimal energy threshold value for a given sector 7, the control unit 10 controls the electric motor 5 so as to deliver more (all) power to the drive wheels (i.e. by injecting power by means of the electric motor 5).

In particular, when calculating the convenience index CI and/or the energy budget, a spatial or temporal usage interval is taken into account which defines for what distance, for how many laps or for how long the electric motor 5 is intended to be used.

Advantageously but not necessarily, the convenience index CI and/or energy budget is calculated so as to finish the charge of the battery pack 6 at the end of the usage interval.

In some non-limiting cases, the usage interval corresponds to one lap or to a finite number of laps. For example, in qualifying, the usage interval corresponds to one lap and the control unit 10 controls the electric motor 5 so as to deliver all the power available in the battery pack 6 within that lap, preferably by modulating it in relation to the convenience index CI.

According to another example, the usage interval is five laps, therefore the control unit 10 controls the electric motor 5 so as to deliver all the power available in the battery pack 6 by distributing it over all five laps, by modulating it in relation to the convenience index CI (for example if it exceeds or does not exceed the optimal energy threshold value in a given sector 7) and preferably considering how much electrical energy is recovered during each lap. In other words, the method involves assigning a certain energy budget that the motor 5 can spend on each lap of the track T (or on each sector 7).

In other non-limiting cases, the usage interval has an unlimited value, therefore the convenience index CI and/or the energy budget is calculated so as to deliver (by means of the electric motor 5), in one lap of the track T, the same electrical power that can be recharged during said lap.

Advantageously but not necessarily, the method comprises a further step in which the driver DR communicates to the vehicle 1, in particular to the control unit 10, by means of an interface device (for example, a small hand lever, a screen, a voice command system, etc.) the desired usage interval based on the intended mission to be performed.

According to some non-limiting embodiments, the sectors 7 into which the route is subdivided have a length between 1 cm and 50 m, in particular each sector 7 has a length between 50 cm and 2 m, more particularly, each sector 7 has a length of approximately one metre.

In some non-limiting cases, the sectors 7 have a different length, in particular, the greater the curvature PC of the track in that section, the shorter the length of the sector 7.

Figure 5:
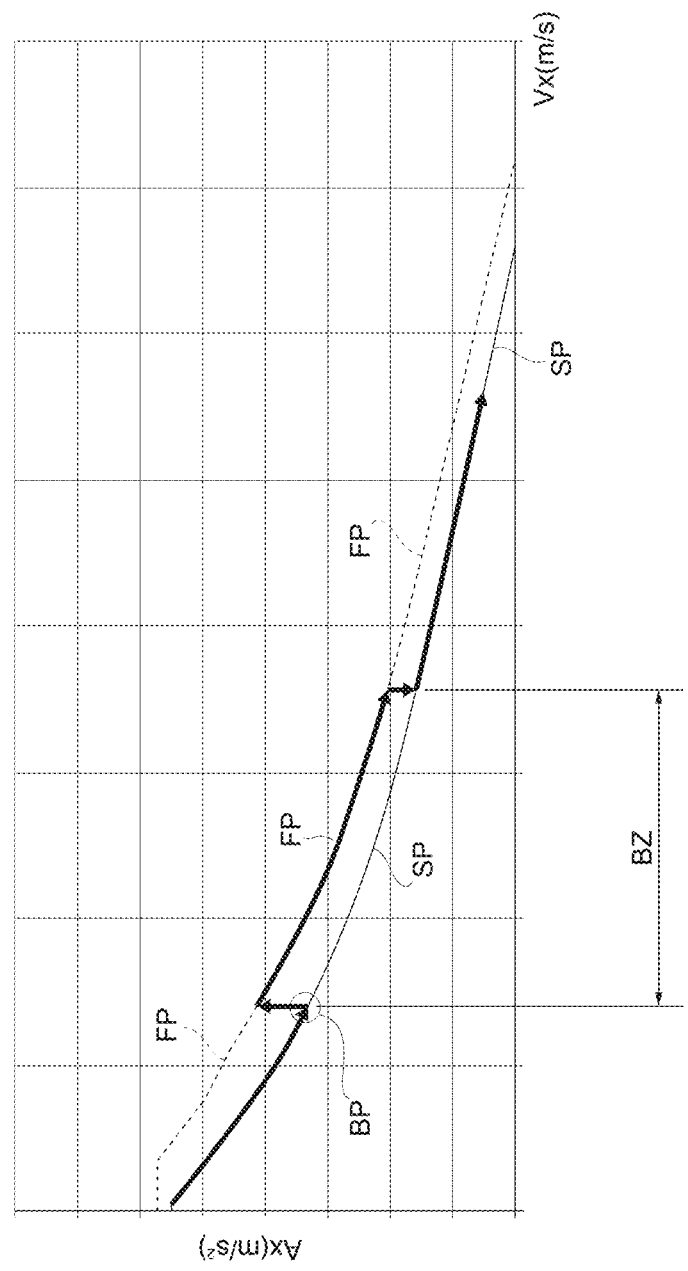
FIG. 5 shows a schematic graph illustrating the variation in power as a function of the convenience index.

In the non-limiting embodiment of the graph illustrated in FIG. 5, the velocity Vx (x-coordinate axis) of the road vehicle and its acceleration Ax (y-coordinate axis) are represented. In particular, the function SP indicates the basic power of the powertrain system 4 of the road vehicle 1 (for example with the torque delivered by the endothermic motor alone), while the function FP indicates the full power of the powertrain system 4 of the road vehicle 1 including the motor 5. In particular, the figure shows the passing from one function to the other with the actuation, by the unit 10, of the electric motor 5. Specifically, the zone BZ represents the boost zone of the electric motor 5 along a given sector 7, which determines a difference in torque delivered from the forward boost point BP and for a certain time interval (for example one second).

In some non-limiting cases, each sector 7 is a straight road, for which the time used to travel it in conditions of basic power SP and in conditions of full power FP is calculated.

According to some non-limiting embodiments, the motor 5 is actuated by the unit 10 with a digital control (i.e. binary, on/off).

Figure 6:
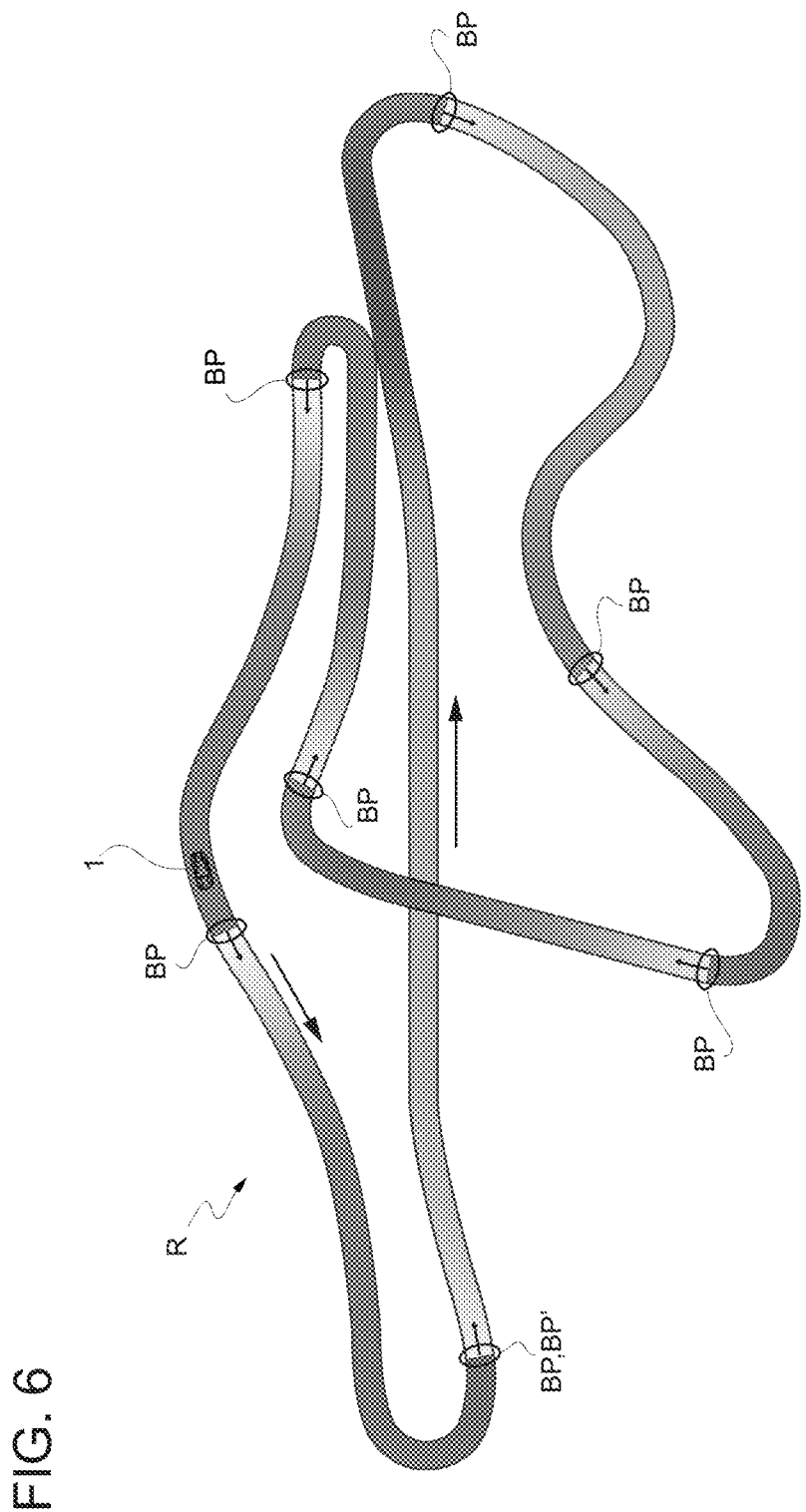
FIG. 6 is a schematic and plan view of the route of FIG. 1 in which a different usage interval has been set.

According to other non-limiting embodiments, such as the one shown in FIG. 6, the supplemental torque delivered by the motor 5 can be modulated as a function of the value of the convenience index CI.

Although the above-described invention particularly refers to a very specific example embodiment, it is not to be considered limited to such example embodiment, falling within its scope all the variations, modifications or simplifications covered by the appended claims, such as, for example, an electric motorization for each of the two drive wheels, a different method for detecting the circuit or for calculating the convenience index, etc.

The above-described control method has numerous advantages.

Firstly, the above-described method allows minimizing the lap time once an energy budget that can be spent on the track lap has been defined, significantly improving the performance without the need for particular actions or measures on the part of the driver.

Moreover, the aforementioned method allows dimensioning in an optimized manner the battery pack of a car provided with at least one electric motor so as to further reduce the lap time, finding a right compromise between the weight of the battery pack and performance.

In addition, the above-described control method allows adjusting the delivery of the electrical power not only as a function of the road vehicle, but also of the structure of the track, allowing a further increase in the performance.

Moreover, the above-described control method allows, during a race, using the electrical power of the battery pack in the best possible manner as a function of the mission to be performed by the vehicle, such as a qualifying, a certain number of laps or simply "endless" test laps.

Finally, the above-described control method is simple and cost-effective to implement in a road vehicle 1 provided with an electric motor that powers the drive wheels, as it does not require the addition of any physical component and can be entirely performed via software.

It is important to note that the above-described control method does not require a large computing capacity or significant amounts of memory and can thus be implemented in a known control unit without the need for updating or upgrading.

LIST OF REFERENCE NUMERALS OF THE FIGURES 1 road vehicle
2 front wheels
3 rear wheels
4 powertrain system
5 electric motors
6 battery pack
7 sectors
10 control unit
A CI value
AC acceleration point
AP acceleration point
ATJ current trajectory
Ax acceleration
B CI value
BP boost point
BRK braking point
BZ boost zone
C CI value
CI convenience index
D CI value
DNB distance to next braking
FA first attempt
FE final estimate
FP full power
PC track curvature
PC' variation in track curvature
R route
S distance travelled
SP basic power
T track
Vx velocity

The invention claimed is:

1. A method for the performance-enhancing driver assistance of a road vehicle (1) driven by a driver (DR) and provided with at least two drive wheels (3) driven by at least one electric motor (5) connected to a corresponding vehicular battery pack (6); the method comprises the steps of:
defining a dynamic model of the road vehicle (1);
determining a route (R) of a race track (T) travelled by the road vehicle (1) and identifying an optimal trajectory with the dynamic model for the route that maintains a highest average velocity during a lap of the race track;
calculating, as a function of the dynamic model of the road vehicle (1) and of the route (R), a convenience index (CI) relative to the use of energy of the vehicular battery pack (6) by the electric motor (5), wherein the convenience index (CI) is defined as time gained on lap per kWh and is a function of a velocity (Vx) of the road vehicle (1) and a distance (DNB) remaining before the next braking;
subdividing the route (R) into a plurality of sectors (7) assigning to each a relative value of the calculated convenience index (CI);
delivering electrical power to the drive wheels (3) according to the value of the convenience index (CI) assigned to each sector (7) of the route (R) in order to optimize the travel times of the route (R),
wherein delivering the electrical power to the drive wheels comprises determining one or more boost points within each of the plurality of sectors, wherein the electrical power is delivered in an amount as a function of the value of the convenience index (CI) assigned to a given one of the plurality of sectors.

2. Method according to claim 1, wherein the step of determining a route (R) occurs by performing a reconnaissance lap of the track (T).

3. Method according to claim 2, wherein as a function of the reconnaissance lap the curvature (PC) of the track (T) is detected as a function of the distance travelled.

4. Method according to claim 3, wherein a profile (VT) of velocity (Vx) at which the road vehicle (1) can travel along the track (T) is developed as a function of the curvature (PC) and the dynamic model of the road vehicle (1).

5. Method according to claim 4, wherein braking points along the route (R) of the track (T) are identified as a function of the velocity profile (VT).

6. Method according to claim 1, wherein, in delivering electrical power to the drive wheels (3), the recharging capacity of the battery pack (6) during the travel of the track (T) is taken into account.

7. Method according to claim 1, wherein, in delivering electrical power to the drive wheels (3), a spatial or temporal usage interval is taken into account and defines for what distance, for how many laps or for how long the electric motor (5) is intended to be used.

8. Method according to claim 7, wherein the electrical power to be delivered to the drive wheels (3) is calculated so as to finish the charge of the battery pack (6) at the end of the usage interval.

9. Method according to claim 7, wherein the usage interval corresponds to one lap or a finite number of laps.

10. Method according to claim 7, wherein the usage interval has an unlimited value; wherein the electrical power to be delivered to the drive wheels (3) is calculated so as to deliver, in one lap, the same electrical power as recharged during said lap.

11. Method according to claim 1, wherein the sectors (7) into which the route (R) is divided have a length between 1 cm and 50 m, wherein each sector (7) has a length between 50 cm and 2 m; and wherein the sectors (7) have different lengths.

12. Road vehicle (1) comprising:
at least two drive wheels (3);
at least one electric motor (5) configured to drive the drive wheels (3);
at least one vehicular battery pack (6) configured to power the electric motor (5) and accumulate energy obtained by means of the drive wheels (3) under braking; and
a control unit (10) configured to control at least the electric motor (5) by performing the method according to claim 1.

* * * * *